United States Patent
Pérez Pastor et al.

(10) Patent No.: US 8,956,495 B2
(45) Date of Patent: Feb. 17, 2015

(54) METHOD OF MANUFACTURING "T" SHAPED STRINGERS FOR AN AIRCRAFT AND CURING TOOL USED THEREOF

(75) Inventors: Augusto Pérez Pastor, Torrelondones (ES); Julián Sánchez Fernández, Leganés (ES); Fernando Esquivias Garía, Esquivias (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 592 days.

(21) Appl. No.: 13/154,489

(22) Filed: Jun. 7, 2011

(65) Prior Publication Data
US 2011/0315307 A1 Dec. 29, 2011

(30) Foreign Application Priority Data

Jun. 18, 2010 (ES) .................................. 201030940

(51) Int. Cl.
*B32B 37/10* (2006.01)
*B29C 70/44* (2006.01)
(Continued)

(52) U.S. Cl.
CPC ............. *B29C 70/446* (2013.01); *B29C 70/543* (2013.01); *B29K 2105/0872* (2013.01);
(Continued)

(58) Field of Classification Search
CPC .......... B64C 1/29; B64C 3/182; B32B 37/10; B32B 37/1018; B29C 66/82661; B29C 70/44
USPC ......... 156/285–287, 196, 212, 443, 468, 475; 29/897.2
See application file for complete search history.

(56) References Cited

U.S. PATENT DOCUMENTS

| 5,242,523 A | 9/1993 | Willden et al. |
| 6,508,909 B1 * | 1/2003 | Cerezo et al. ............... 156/306.6 |

(Continued)

FOREIGN PATENT DOCUMENTS

| ES | 2 185 443 | 4/2003 |
| ES | 2 205 961 | 5/2004 |

(Continued)

OTHER PUBLICATIONS

Spanish Search Report, issued Mar. 27, 2012 (with partial English translation) in a Spanish application that is a foreign counterpart to the present application.

*Primary Examiner* — Christopher Schatz
(74) *Attorney, Agent, or Firm* — Wenderoth, Lind & Ponack, L.L.P.

(57) ABSTRACT

A method of manufacturing "T" shaped stringers for an aircraft whereby the "T" shaped stringers have a stringer web and a stringer foot, the method comprising: a first step of hot-forming a carbon fiber laminate in order to achieve semi-stringers with an "L" shaped cross-section, a second step of placing together two hot-formed "L" shaped semi-stringers in order to form a "T" shaped stringer, a third step of co-bonding the resulting "T" shaped stringer on a cured skin with an adhesive line between them, and a fourth step of curing the obtained "T" shaped stringer inside a vacuum bag using invar alloy angles as curing tools. The invar alloy angles are cut at a radius area eliminating a part of the invar alloy angles covering the stringer foot in order to define an invar alloy piece having no foot.

5 Claims, 3 Drawing Sheets

(51) Int. Cl.
  *B29C 70/54* (2006.01)
  *B29K 105/08* (2006.01)
  *B29K 307/04* (2006.01)
  *B29L 31/00* (2006.01)
  *B29L 31/30* (2006.01)

(52) U.S. Cl.
  CPC ....... *B29K2307/04* (2013.01); *B29L 2031/001* (2013.01); *B29L 2031/30* (2013.01); *B29L 2031/3082* (2013.01)
  USPC ........... 156/285; 156/196; 156/212; 156/286; 156/443; 156/448; 156/475

(56) References Cited

U.S. PATENT DOCUMENTS

| | | | |
|---|---|---|---|
| 2002/0144401 A1* | 10/2002 | Nogueroles et al. | 29/897.2 |
| 2005/0127576 A1* | 6/2005 | Menendez et al. | 264/510 |
| 2007/0175571 A1* | 8/2007 | Rubin et al. | 156/196 |
| 2009/0165931 A1* | 7/2009 | Callis | 156/153 |

FOREIGN PATENT DOCUMENTS

| | | |
|---|---|---|
| ES | 2 271 513 | 4/2007 |
| WO | 2008/152582 | 12/2008 |

* cited by examiner

METHOD OF MANUFACTURING "T" SHAPED STRINGERS FOR AN AIRCRAFT AND CURING TOOL USED THEREOF

BACKGROUND OF THE INVENTION

1. Technical Field

The present invention falls within the aeronautical industry and relates to aircraft stringers. More particularly it relates to "T" shaped composite stringers and methods of making these.

2. Background Art

In aircraft construction, a stringer or longeron or stiffener is a thin strip made of carbon fiber. Several strips are co-bonded on a cured skin in order to build a part of the aircraft (e.g. wings, HTP, etc.).

A very common type of stringers is that with a "T" shaped cross section defining a stringer web and a stringer foot.

Normally, a method of manufacturing a "T" shaped stringer for an aircraft comprises a first step of hot-forming laminates in order to achieve semi-stringers with an "L" shaped cross section, and a second step of placing together two hot-formed semi-stringers to achieve a "T" shaped stringer. Then, the "T" shaped stringer is co-bonded on a cured skin with an adhesive line between them.

It is also well known in the aeronautical industry that such method comprises a third step, being a curing cycle, in which curing tools, preferably invar alloy angles of approximately 90°, are placed following the contour of the hot-formed "T" shaped stringer inside a vacuum bag during the curing cycle. It should be noted that invar angles are of 90° exactly when the skin on which the stringers are co-bonded is a plane skin. But, when the skin is curved, then the angle between the foot and the web of a stringer vary slightly, thus making the invar angle not exactly 90°.

These "T" shaped stringers, being formed under the traditional manufacturing methods in which uncured stringers are co-bonded on cured skins with the stringer curing tool inside the vacuum bag, are subjected to a "Mexican hat effect" drawback which occurs when the stringer thickness becomes:

smaller than the nominal thickness at the end of the stringer web, and greater than the nominal thickness at the ends of the stringer feet.

Thus, if any other piece has to be assembled on the stringer feet and the difference between the thicker and the thinner points of the stringer feet is too great, then a solid shim has to be added in order to level the surface on which the other piece has to be assembled. The use of these solid shims increases assembly difficulties and the amount of work involved.

ES Patent Application P201030219 describes a traditional method of manufacturing stringers especially with a "T" shaped cross section.

It was, therefore, desirable to find a method of manufacturing stringers in which the "Mexican hat effect" drawback explained above is minimized.

SUMMARY OF THE INVENTION

The present invention is designed to overcome above-mentioned drawbacks of "T" shaped stringers.

It is an object of the present invention to provide a method of manufacturing "T" shaped stringers for building structures of aircrafts that reduces assembly time, work and difficulties, especially when another piece is assembled on the stringers.

The main object of the present invention is to minimize an effect known as the "Mexican hat effect" undergone by "T" shaped stringers. This means to minimize the occurrence in which the stringer thickness becomes smaller than the nominal thickness at the end of the stringer web, and greater than the nominal thickness at the end of the stringer foot.

Thus, it is a further object of the invention to avoid the use of solid shims when another piece is to be assembled on the stringer foot.

A further object of the present invention is to describe a curing tool used for overcoming the above-mentioned effect.

Lastly, another object of the present invention relates to facilitating the step of demolding of the stringers from the vacuum bag.

All throughout the present invention, the term "invar", also known generically as FeNi36 (64FeNi in the US), is a nickel (36%) and steel (64%) alloy, notable for its uniquely low coefficient of thermal expansion (CTE). The name "invar" derives from the word invariable, referring to its lack of expansion or contraction with temperature changes.

Thus, invar alloy exhibits extremely low expansion around ambient temperatures, making it particularly useful in applications where minimum thermal expansion and high dimensional stability are required, such as in precision instruments like optoelectronic devices, optical and laser benches, electronics, and other kinds of scientific instruments. It also has great applicability in the manufacturing of tools for curing composite materials. The term "composite materials" includes various non-homogeneous polymer-based and non-polymeric based materials, commonly referred to as "reinforced composites", "carbon-fiber composites" or other terms known in the art.

Hence, the present invention describes a method of manufacturing "T" shaped stringers for an aircraft having a stringer web and a stringer foot, and the method comprising:

a first step of hot-forming a carbon fiber laminate in order to achieve semi-stringers with an "L" shaped cross-section, a second step of placing together two hot-formed "L" shaped semi-stringers in order to form a "T" shaped stringer, a third step of co-bonding the resulting "T" shaped stringer on a cured skin with an adhesive line between them, and a fourth step of curing the obtained "T" shaped stringer inside a vacuum bag using invar alloy angles as curing tools.

Before carrying out fourth step, the invar alloy angles are cut at a radius area eliminating a part of the invar alloy angles covering the stringer foot in order to define an invar alloy piece having no foot.

Preferably the invar alloy angles are cut at a radius area in those zones where other pieces are going to be assembled. In such embodiments, the zone in which another piece is going to be assembled is the stringer foot; thus the piece to be assembled remains in direct contact with the foot of the stringer.

In a second embodiment of the present invention, an elastomeric pad is arranged on the stringer foot once the invar alloy angles have been cut. The elastomeric pad covers the stringer foot.

In addition, in order to enhance demolding of the stringers, a third embodiment of the present invention co-bonds cured glass fiber on the stringer foot in the place left by the part of the invar alloy angle that is eliminated, and this cured glass fiber is in direct contact with the release film of the vacuum bag during the curing cycle.

The cured glass fiber can be placed:

before hot-forming the stringers, or once the stringers are hot-formed, but before placing the invar angles.

Furthermore, when more than one "T" shaped stringer is co-bonded at the same time on a cured skin, the present invention uses a filler, placed between the feet of adjacent stringers, in order to avoid an edge effect. The edge effect is produced because the material, before being cured and during the curing cycle is rather soft, thus the vacuum bag tends to round off the corners which are not protected by the invar piece.

The filler is selected from the group consisting of carbon fiber, metal, glass fiber and any resin curing at ambient temperature. If the filler is any resin curing at ambient temperature, the resin can be cured before and put between the two adjacent stringers as a filler.

With the new geometry proposed for the invar alloy angles by the present invention, the use of solid shims, when any other piece is going to be assembled on the stringer foot is, thus, avoided.

In addition, the previously explained "Mexican hat effect" is minimized to tenths of a millimeter.

A further advantage of the present invention relates to the weight of the invar alloy angles, as with the proposed solution the weight of the invar alloy angles is lower than the weight of traditional invar alloy angles with their conventional geometry.

BRIEF DESCRIPTION OF THE DRAWINGS

The present invention will be entirely understood on the basis of the following detailed description of the embodiments of the present invention and the accompanying drawings that are presented, solely as an example and which are therefore not restrictive within the present invention, and in which.

DETAILED DESCRIPTION OF THE INVENTION

The following description is provided for the benefit of the reader only, and is not intended to limit in any way the invention as set forth by the claims.

Figure 1A:
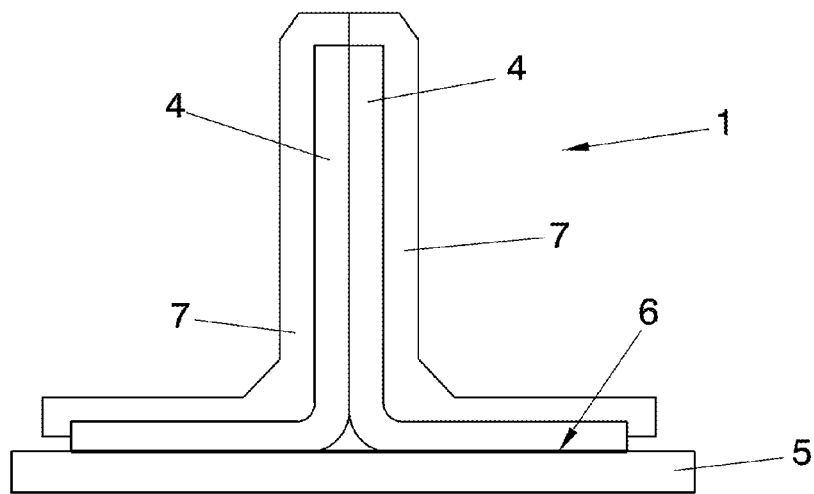
FIG. 1A depicts the cross section of a traditional "T" shaped stringer.

Thus, FIG. 1A shows a traditional "T" shaped stringer (1), starting from two hot-formed "L" shaped semi-stringers (4) co-bonded on a cured skin (5) with an adhesive line (6) between them. In addition, in FIG. 1A, invar alloy angles (7) are placed following the contour of the hot-formed "T" shaped stringer.

Figure 1B:
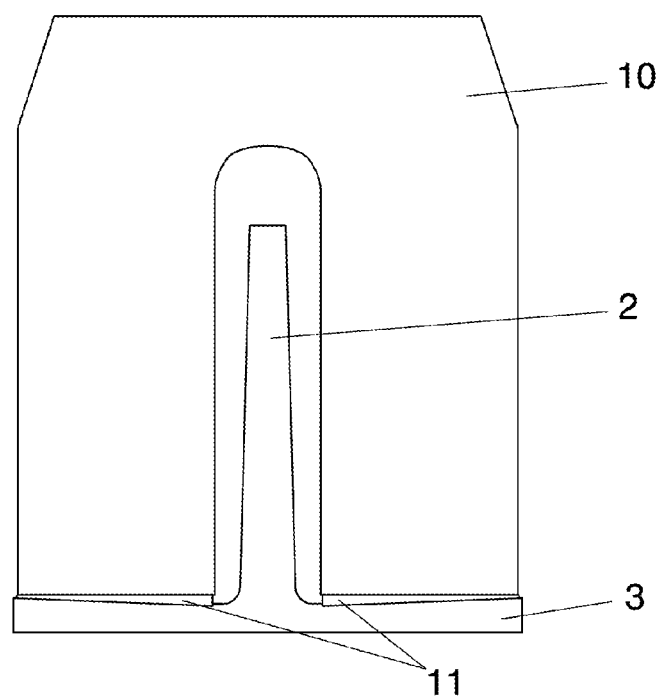
FIG. 1B depicts the cross section of the current drawback faced by "T" shaped stringers when another piece is to be assembled on the stringer foot.

FIG. 1B shows a schematic exemplification of the previously explained drawback, known as the "Mexican hat effect", faced by the "T" shaped stringers (1) directly derived from the traditional method of manufacturing the same. Thus, in FIG. 1B it can be seen how, a space is defined between the stringer foot (3) and a piece to be assembled (10) on it. This space is traditionally fit with a solid shim (11). But, as explained before, setting these solid shims (11) increases mounting difficulties and the amount of work involved.

Figure 2:
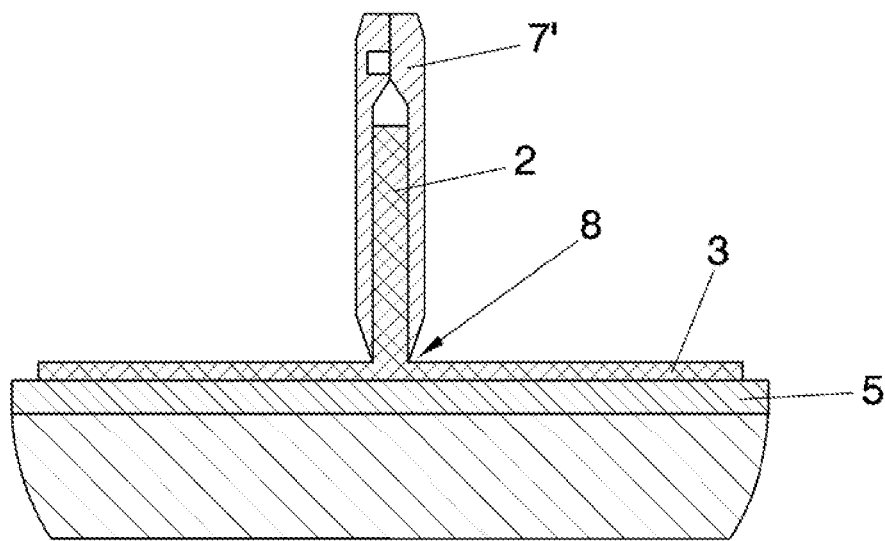
FIG. 2 shows the cross section of one embodiment of the present invention.

Thus, the present invention describes a method of manufacturing "T" shaped stringers (1) for an aircraft having a stringer web (2) and a stringer foot (3), the method comprising:
- a first step of hot-forming a carbon fiber laminate in order to achieve semi-stringers (4) with "L" shaped cross-section,
- a second step of placing together two hot-formed "L" shaped semi-stringers (4) in order to form a "T" shaped stringer (1),
- a third step of co-bonding the obtained "T" shaped stringer on a cured skin (5) with an adhesive line (6) between them in order to obtain the final structure, and
- a fourth step of curing the obtained "T" shaped stringer (1) inside a vacuum bag using invar alloy angles (7) as curing tools with the characteristic feature that before carrying out this fourth step the invar alloy angles (7) are cut at a radius area (8) eliminating a part of the invar alloy angles covering the stringer foot (3) in order to define an invar alloy piece (7', 7") having no foot, as shown in FIG. 2.

Thus, the embodiment shown in FIG. 2 depicts the invar alloy angles (7) cut at a radius area (8) in the zone where another piece can be assembled on the stringer foot (3), once the stringer has been cured. The cut being made in a radial sense ending in the union vertex between the web (2) and the foot (3) of the stringer (1).

Figure 3:
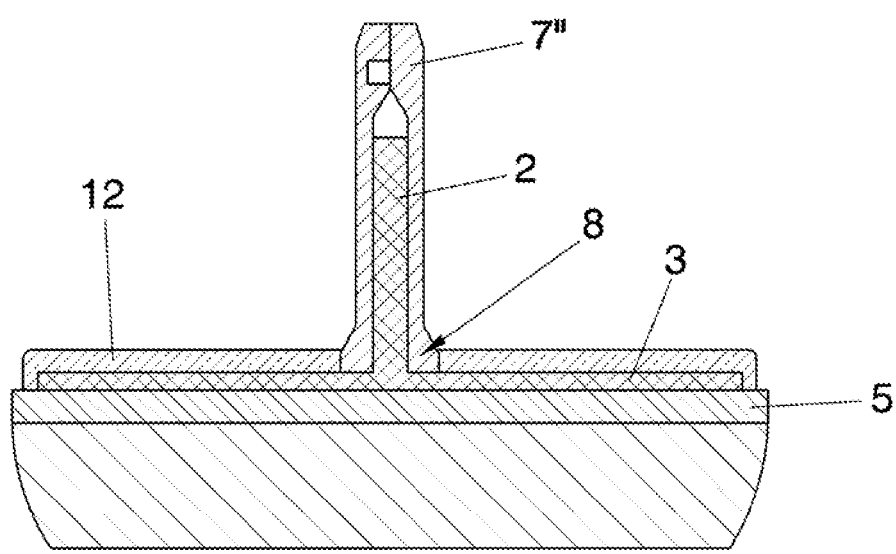
FIG. 3 shows the cross section of a second embodiment of the present invention.

FIG. 3 shows a second embodiment of the present invention in which the cut is made straight, keeping the whole union vertex covered by the resulting invar piece (7"). In this second embodiment, an elastomeric pad (12) is arranged on the stringer foot (3) along with the invar alloy piece (7") having no foot, instead of the part of the invar alloy angles (7) being cut. The elastomeric pad (12) covers the stringer foot (3).

In a preferred embodiment, the elastomeric pad (12) is rubber. Rubber pads can be re-used and last several curing cycles.

In a third embodiment of the present invention, cured glass fiber is co-bonded on the stringer foot (3) in the place left free by the part of the invar alloy angle (7) that is eliminated. This means that the cured glass fiber would be in direct contact with the release film of the vacuum bag during the curing cycle.

Figure 4:
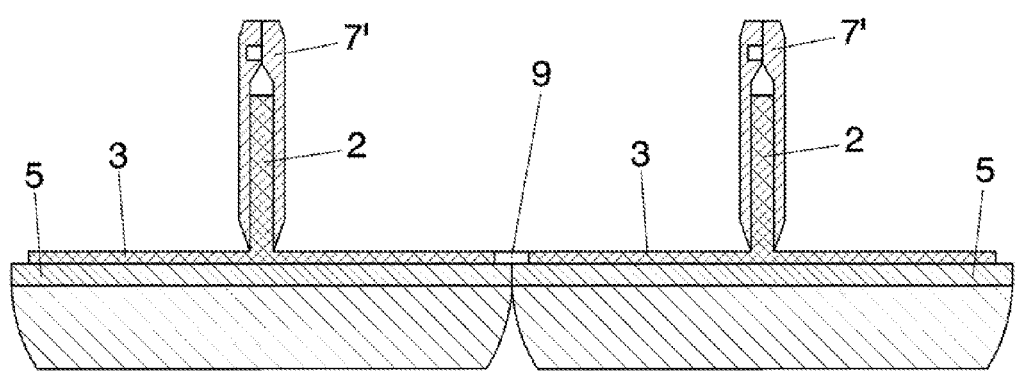
FIG. 4 shows the cross section of two adjacent stringers between which a filler is placed.

Furthermore, as depicted in FIG. 4, when more than one "T" shaped stringer is co-bonded at the same time on a cured skin (5), the present invention describes a filler (9), placed between the feet (3) of adjacent stringers in order to avoid the edge effect. The filler (9) being selected from the group consisting of carbon fiber, metal, glass fiber and any resin curing at ambient temperature.

The invention claimed is:

1. A method of manufacturing a "T" shaped stringer for an aircraft, the method comprising:
   hot-forming a carbon fiber laminate in order to achieve semi-stringers (4), each with an "L" shaped cross section,
   placing together two of the hot-formed "L" shaped semi-stringers (4) in order to form the "T" shaped stringer (1) such that the "T" shaped stringer (1) has a stringer foot (3) and a stringer web (2) projecting from the stringer foot (3) with union vertexes defined between the stringer foot (3) and the stringer web (2),
   co-bonding the "T" shaped stringer (4) on a cured skin (5) with an adhesive line (6) between the "T" shaped stringer (4) and the cured skin (5), arranging invar alloy angles (7) on the stringer web (2) of the "T" shaped stringer (4), and cutting the invar alloy angles (7) along lines extending from the union vertexes, so as to eliminate parts of the invar alloy angles (7) covering the stringer foot (3) and define invar alloy pieces (7', 7") covering an entire length of the stringer web (2) but having no foot, and after said cutting of the invar alloy angles (7), curing the "T" shaped stringer (1) inside a vacuum bag using the invar alloy pieces (7', 7") as curing tools.

2. The method according to claim 1, wherein the cut defining the invar alloy piece (7') is a radial cut.

3. The method according to claim 1, further comprising, before said curing of the "T" shaped stringer (1) and after said cutting of the invar alloy angles (7) to define the invar alloy pieces (7', 7") having no foot, co-bonding cured glass fiber on the stringer foot (3).

4. The method according to claim 1, wherein more than one "T" shaped stringer (1) is co-bonded at the same time and a filler (9) is placed between the feet (3) of adjacent stringers in order to avoid an edge effect.

5. The method according to claim 4, wherein the filler (9) is selected from the group consisting of carbon fiber, metal, glass fiber and any resin curing at ambient temperature.

\* \* \* \* \*